United States Patent [19]
Evertz

[11] 3,934,107
[45] Jan. 20, 1976

[54] PROCESS FOR REPAIRING SLAG LADLES

[76] Inventor: Egon Evertz, Varlander Strasse, 23, 565 Solingen, Germany

[22] Filed: Apr. 23, 1974

[21] Appl. No.: 463,422

[30] Foreign Application Priority Data
May 2, 1973 Germany............................ 2321946

[52] U.S. Cl. ...................... 219/76; 29/402; 164/92; 219/137
[51] Int. Cl.² ...................... B23K 9/04; B22D 19/10
[58] Field of Search ............. 219/76, 137; 29/401.6, 29/402; 164/92

[56] References Cited
UNITED STATES PATENTS 2,091,082  8/1937  Osolin.............................. 29/401.6
2,494,970  1/1950  Shea..................................... 219/76
3,142,114  7/1964  Zieger................................... 29/402

FOREIGN PATENTS OR APPLICATIONS
1,068,088  9/1959  Germany.............................. 29/402

Primary Examiner—J. V. Truhe
Assistant Examiner—Clifford C. Shaw
Attorney, Agent, or Firm—Holman & Stern

[57] ABSTRACT

The invention provides a process for repairing slag ladles for iron and steel making, the process including securing a steel plate to the exterior of the ladle over a damaged area, and subsequently forming successive welded layers within the ladle using a variety of electrodes, the lowermost layer forming a homogeneous joint with the steel plate. The invention also embraces a slag ladle produced by the above process.

5 Claims, 1 Drawing Figure

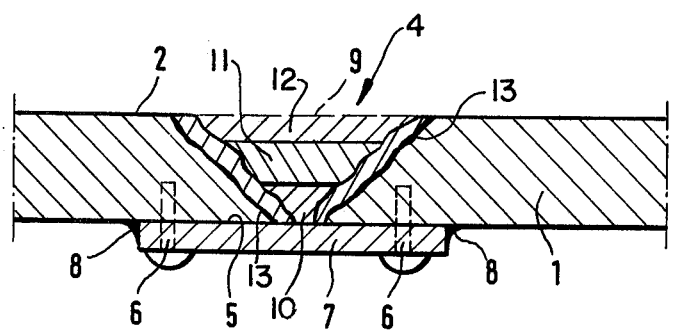

PROCESS FOR REPAIRING SLAG LADLES

BACKGROUND OF THE INVENTION

This invention relates to a process for repairing slag ladles, as used in the production of iron and steel, which are damaged as a result of thermal and chemical stresses.

Some types of slag ladles are made from hematite or steel iron and, when used, can suffer thermally or chemically produced damage as, apart from the slag to be removed, liquid metal occasionally inadvertently entering with the slag can cause damage too. Because its specific gravity is greater, the liquid metal accumulates at the bottom of the ladle and can cause the ladle material to melt so that considerable erosion takes place over a long period of use, which usually can even be seen on the exterior of the ladle in the form of cracks or holes. The ladle can no longer be used in production and frequently has to be scrapped as no suitable repair processes are available.

Slag ladles damaged in this way cannot be repaired using known welding repair methods.

In one known process for filling the eroded or burnt parts of cast iron or hematite iron ingot and casting moulds, the damaged part is first covered with a layer of cast iron rods and steel electrodes. Then, intermediate spaces are filled by means of a steel electrode with simultaneous melting of a cast iron rod, following which other layers are applied exclusively with a current-carrying cast iron rod. In so far as with this state of the art, and with the present application, these are considered as welding processes, then these belong to the class of so-called cold welding processes. With the aforesaid known method, networks of fine cracks form in the walls of the mould which also continue through the welding material so that finally, cracks are also present in the region of the completely welded over damaged area, so that expansion and contraction is possible without destroying the material. Cracks of this type also occur in the case of slag ladles. However, as the damaged parts are considerably deeper and completely penetrate the wall, use of the known process would means that the complete welded layer would fall out of the bottom of the ladle when contraction took place.

SUMMARY OF THE INVENTION

An object of the invention is to provide a process such that the damaged parts of slag ladles can be satisfactorily repaired and the ladles can continue to be used as required.

According to the invention, this is achieved in that first of all, a suitably sized steel plate is secured to the exterior of the ladle over the damaged area, a homogeneous joint with the steel plate is then produced within the ladle by building up a first welded layer by means of steel electrodes, at least one further layer is welded on using steel electrodes and cast iron electrodes simultaneously, and finally at least one further layer is welded on using cast iron electrodes so that in all, the filling formed by the layers corresponds in size to the transverse section of the interior of the slag ladle at the location occupied by the layers. Welding a layer using a steel electrode and a cast iron electrode simultaneously can be done so that only the steel electrode carries current, while the cast iron electrode is held in the arcs as a rod not connected to the welding current supply. As is known, for practical purposes, the steel electrodes have a lime based coating.

In the case of a slag ladle repaired according to the invention, the build-up weld containing shrinkage cracks is effectively prevented from crumbling away by the welded layers being homogeneously and firmly joined to the external steel plate. The size of the plate is such that it covers the whole damaged area. As a result of the firm joint between the steel plate and the welded material there is an active tractive force, even when the weld cools down, so that the steel plate on the one side and the inner welded area on the other are drawn together. When cooling, any cracks which might be present are then sealed and not opened, as is the case in the known art.

In order to be able to produce a reliable joint in the wall area of the damaged section too, the transitional area between the wall of the damaged area of the ladle and the welded material disposed within the damaged wall portion, is welded to the undamaged peripheral area of the damaged section exclusively by means of a steel electrode. Therefore, the liquified material which results consists of the material melted off the steel electrode and of the slag ladle's melted wall material.

As the steel plate placed outside the damaged area according to the invention is held by the material introduced by welding which projects inside the ladle and opens out at the top, no additional demands are made on it concerning a reliable joint with the bottom of the slag ladle. Nevertheless, it may be advantageous to secure the steel plate with bolts held in the undamaged wall material of the slag ladle. With renewed erosion, this is an additional means of preventing the crack from opening wider in a known way. It is also possible to weld the steel plate to the outside wall of the slag ladle.

BRIEF DESCRIPTION OF THE DRAWING

The invention will now be described, by way of example, with reference to the accompanying drawing in which:

The FIGURE shows a section of the damaged bottom of a slag ladle including the individual layers after being repaired according to the invention.

DETAILED DESCRIPTION OF PREFERRED EMBODIMENT

The FIGURE illustrates part of the bottom of a slag ladle damaged by use in the way described and designated 1. The damaged area starts from the inside 2 and extends downwards to form a generally funnel-shaped hole or crack 4 in the outside wall 5 of the bottom of the slag ladle. Bolts 6 are introduced into the undamaged material of the slag ladle bottom round the damaged area and secure a steel plate 7 in position over the hole. This plate can also be attached to the bottom of the slag ladle by welding seams 8 in addition or by these alone.

When the steel plate 7 has been fitted, the damaged area sealed at the bottom by this plate is filled up in the way described until the original internal dimension 9 of the slag ladle is reached. This value can also be slightly exceeded at first, in which case it is levelled off by grinding.

The layers produced with the repair process are illustrated in the FIGURE which is a diagram of a vertical section through a damaged area. The lowermost layer is the steel plate 7 sealing the damaged area from the exterior, as described above. A layer 10 is first welded onto the steel plate with steel electrodes. This is followed by a layer 11 produced from steel electrodes and cast iron electrodes, where only the steel electrodes carry current, whereas the cast iron electodes are held in the arcs. A layer 12 is produced where only a current carrying cast iron electrode is used. Finally, layer 13 is a steel plus cast iron layer produced by welding the wall of the damaged ladle with the steel electrode.

If a network of cracks forms in the repaired area of slag ladles repaired according to the invention, this is not harmful as the damaged area is supported by the steel plate 7.

By appropriate use of the inventive principle, the process according to the invention can also be used to repair other, similarly affected items.

Moreover, the invention can be applied to damaged areas which are wider at their lower ends or which are cylindrical.

I claim:

1. A process for repairing slag ladles, used in the production of iron and steel, which are damaged by thermal and chemical stresses, comprising the steps of: first securing a suitably sized steel plate to the exterior of the ladle over the damaged area; forming a homogeneous joint with the steel plate within the ladle by building up a first welded layer by means of steel electrodes; welding on at least one further layer using steel electrodes and cast iron electrodes simultaneously; and finally, welding on at least one layer using cast iron electrodes so that, in all, the filling formed by the layers is at least equal to the original thickness of the slag ladle at the location occupied by the layers.

2. The process according to claim 1, further comprising welding the transitional area between the wall of the damaged area of the ladle and the layers of welded steel and cast iron disposed within the damaged wall portion to the undamaged peripheral area of the damaged section by means of steel electrodes only.

3. The process according to claim 1, wherein the steel plate is secured by means of bolts secured in the undamaged wall material of the slag ladle.

4. The process according to claim 1, wherein the steel plate is secured by being firmly welded to the outside wall of the slag ladle.

5. A slag ladle produced by the process according to claim 1.

* * * * *